US012662424B2

(12) United States Patent
Miller et al.

(10) Patent No.: US 12,662,424 B2
(45) Date of Patent: *Jun. 23, 2026

(54) REINFORCEMENT BAR AND METHOD FOR MANUFACTURING SAME

(71) Applicant: REFORCETECH LTD., Limerick (IE)

(72) Inventors: Leonard W. Miller, Lysaker (NO); Per Cato Standal, Nesøya (NO)

(73) Assignee: REFORCETECH LTD., Limerick (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,433

(22) Filed: Oct. 3, 2023

(65) Prior Publication Data

US 2024/0109811 A1     Apr. 4, 2024

Related U.S. Application Data

(62) Division of application No. 13/825,788, filed as application No. PCT/NO2011/000300 on Oct. 21, 2011, now Pat. No. 11,820,709.

(30) Foreign Application Priority Data

Oct. 21, 2010     (NO) .................................... 20101485

(51) Int. Cl.
*C04B 20/00*          (2006.01)
*B29C 53/58*          (2006.01)
(Continued)

(52) U.S. Cl.
CPC .......... *C04B 20/0068* (2013.01); *B29C 53/58* (2013.01); *C04B 20/1029* (2013.01);
(Continued)

(58) Field of Classification Search
CPC ............ C04B 20/0068; C04B 20/1029; C04B 14/386; C04B 14/42; C04B 14/4668;
(Continued)

(56) References Cited

U.S. PATENT DOCUMENTS 4,620,401 A     11/1986   L'Espérance et al.
5,141,812 A      8/1992   Marx et al.
(Continued)

FOREIGN PATENT DOCUMENTS

CN          2740607 Y      11/2005
CN          201236420       5/2009
(Continued)

OTHER PUBLICATIONS

JP 07149552 English Machine Translation. translated Jan. 31, 2017.*

(Continued)

*Primary Examiner* — Jennifer A Gillett
(74) *Attorney, Agent, or Firm* — FOLEY & LARDNER LLP

(57)          ABSTRACT

Reinforcement bars for concrete structures, comprising continuous, parallel fibers, made of basalt, carbon, glass fiber, or the like, embedded in a cured matrix, each bar being made of at least one fiber bundle comprising a number of parallel, cylindrical cross section fibers and said bars being provided with a surface shape and/or texture which contributes to good bonding with the concrete. Part of the surface of each bar being deformed prior to or during the curing by: a) strings of an elastic or inelastic, and/or b) at least one deformed section of each reinforcement bar; thereby producing a roughened surface.

9 Claims, 6 Drawing Sheets

(51) Int. Cl.
　　*C04B 20/10*　　(2006.01)
　　*E04C 5/07*　　(2006.01)
(52) U.S. Cl.
　　CPC ................ *E04C 5/073* (2013.01); *E04C 5/07*
　　　　(2013.01); *Y10T 428/2918* (2015.01); *Y10T*
　　　　　　　　　　　　　　*428/2936* (2015.01)
(58) Field of Classification Search
　　CPC ..... C04B 28/02; C04B 2201/50; C04B 14/38;
　　　　　　C04B 20/1018; B29C 53/58; E04C 5/073;
　　　　　　　E04C 5/07; Y10T 428/2918; Y10T
　　　　　　　　　　　　　　　　　428/2936
　　See application file for complete search history.

(56)　　　　　　　References Cited

U.S. PATENT DOCUMENTS

| | | | |
|---|---|---|---|
| 5,182,064 | A | 1/1993 | Ishizuka et al. |
| 5,725,954 | A | 3/1998 | Montsinger |
| 5,749,211 | A | 5/1998 | Kimura et al. |
| 6,174,595 | B1 | 1/2001 | Sanders |
| 6,258,453 | B1 | 7/2001 | Montsinger |
| 6,811,877 | B2 | 11/2004 | Haislet et al. |
| 7,396,496 | B2 | 7/2008 | Bull |
| 2001/0051266 | A1 | 12/2001 | Rieder et al. |
| 2004/0018358 | A1 | 1/2004 | Rieder et al. |
| 2004/0166299 | A1 | 8/2004 | Haislet et al. |
| 2008/0261042 | A1 | 10/2008 | Brandstrom |

FOREIGN PATENT DOCUMENTS

| | | |
|---|---|---|
| EP | 0 367 187 A2 | 5/1990 |
| EP | 0 633 348 A1 | 1/1995 |
| EP | 2 087 987 A1 | 8/2009 |
| GB | 2 175 364 | 11/1986 |
| JP | 01-207552 A | 8/1989 |
| JP | 04-089346 A | 3/1992 |
| JP | H04-089346 | 3/1992 |
| JP | H489346 A | 3/1992 |
| JP | 4224154 B2 | 8/1992 |
| JP | 07-149552 A | 6/1995 |
| JP | 07-217628 A | 8/1995 |
| JP | 08-091913 | 4/1996 |
| JP | H08-091913 A | 4/1996 |
| JP | 2002-154853 A | 5/2002 |
| JP | 2003-251704 A | 9/2003 |
| JP | 03-121424 U | 4/2006 |
| JP | 2007-070204 A | 3/2007 |
| JP | 2007-084363 A | 4/2007 |
| JP | 2008-037680 A | 2/2008 |
| JP | 2008-128314 A | 6/2008 |
| JP | 2010-525197 A | 7/2010 |
| KR | 2006/0009486 A | 2/2006 |
| KR | 20060009486 | 2/2006 |
| RU | 55310 | 8/2006 |
| RU | 2287431 | 11/2006 |
| RU | 77310 U1 | 10/2008 |
| WO | WO-98/10159 A1 | 3/1998 |
| WO | WO-98/31891 A1 | 7/1998 |
| WO | WO-02/06607 A1 | 1/2002 |
| WO | WO-03/025305 A1 | 3/2003 |
| WO | WO-2008/128314 A1 | 10/2008 |

OTHER PUBLICATIONS

JP 2007070204 English Machine Translation. translated Jan. 27, 2017.*

Concrete Anchor Bolts, Everything About Concrete, https://www.everything-about-concrete.com/concrete-anchor-bolts.html, retrieved Jun. 15, 2021.

English Machine Translation of JP2007084363, eSpacenet, retrieved Jan. 27, 2017.

Examination Report dated Jun. 22, 2017, received in corresponding European application No. 11 834 683.2, 4 pages.

Final Office Action on U.S. Appl. No. 13/825,788 DTD Feb. 4, 2021.

Final Office Action on U.S. Appl. No. 13/825,788 DTD Mar. 20, 2023.

Final Office Action on U.S. Appl. No. 13/825,788 DTD Jul. 29, 2019.

Final Office Action on U.S. Appl. No. 13/825,788 DTD Nov. 17, 2017.

International Preliminary Report on Patentability dated Mar. 13, 2013 issued in connection with International Application No. PCT/NO2011/000300.

International Search Report dated Jan. 17, 2012 issued in connection with PCT/NO2011/000300.

Non-Final Office Action on U.S. Appl. No. 13/825,788 DTD Mar. 23, 2017.

Non-Final Office Action on U.S. Appl. No. 13/825,788 DTD Jun. 9, 2022.

Non-Final Office Action on U.S. Appl. No. 13/825,788 DTD Jun. 25, 2020.

Non-Final Office Action on U.S. Appl. No. 13/825,788 DTD Nov. 2, 2018.

Norwegian Search Report dated Sep. 5, 2011 issued in connection with Norwegian Application No. 20101485.

Notice of Allowance on U.S. Appl. No. 13/825,788 DTD Jul. 3, 2023.

Office Action dated Apr. 12, 2016, received in corresponding Japanese Application No. 2013-534845 and English translation, 10 pages.

Office Action mailed May 5, 2019 in corresponding Korean application No. 10-2018-7034412 (7 pages) and English translation (8 pages).

Supplementary European Search Report dated Jun. 21, 2016, received in corresponding European application No. 11 83 4683.2, 8 pages.

Communication under Rule 71(3) EP dated Dec. 14, 2023 issued in EP Application No. 11834683.2, 40 pages.

Norwegian Search Report dated Apr. 10, 2024 issued in NO Patent Application No. 20130401, with English translation, 2 pages.

* cited by examiner

Tight wind

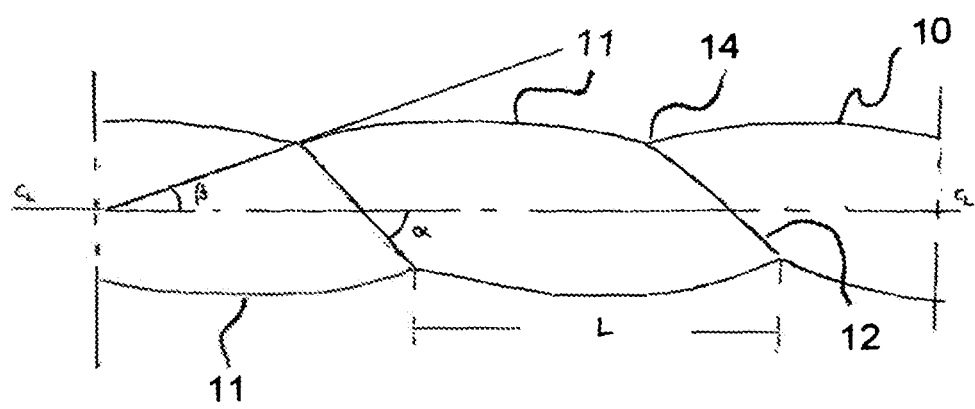
FIG. 3
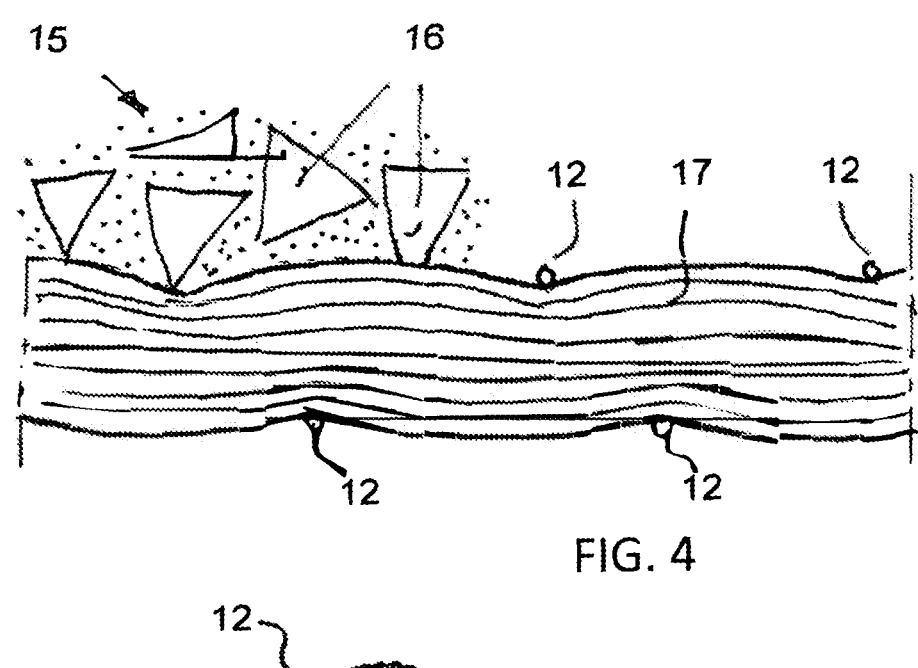
FIG. 4
FIG. 5

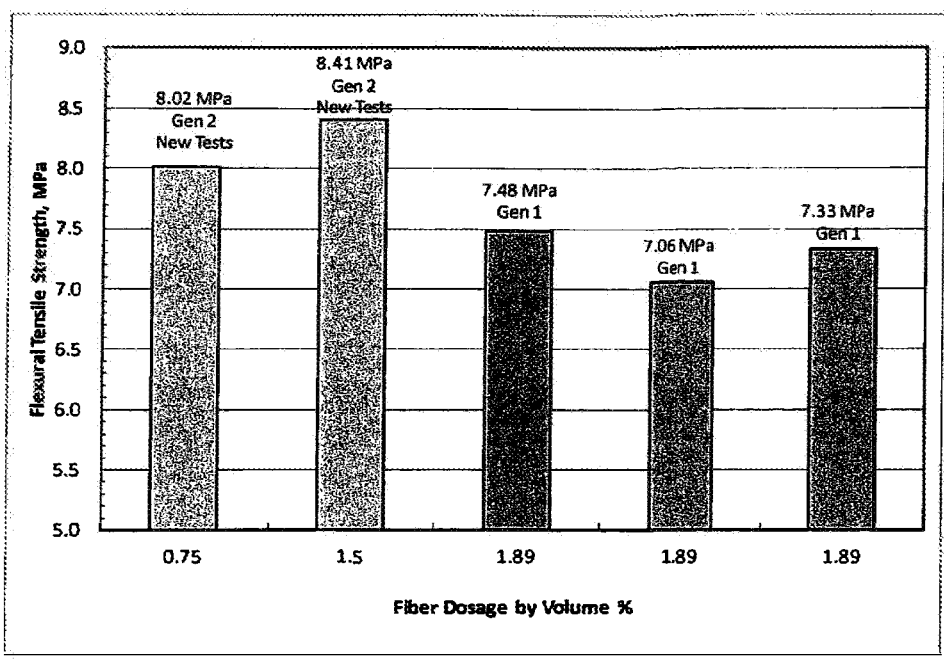
FIG. 6     Flexural Tensile Strength of Dry Mix Concrete
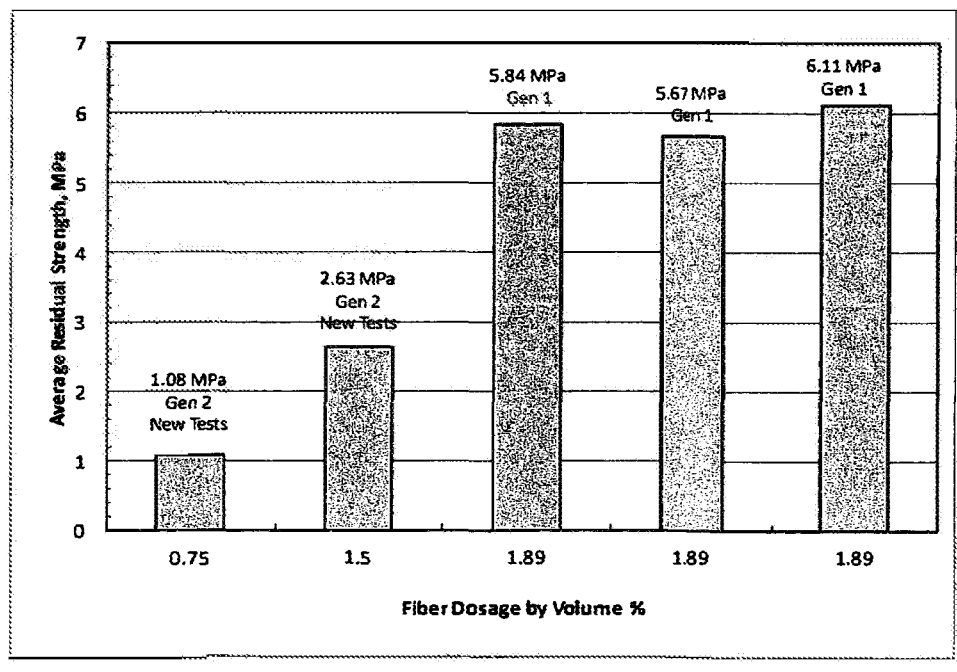
FIG. 7     Average Residual Strength of Dry Mix Concrete

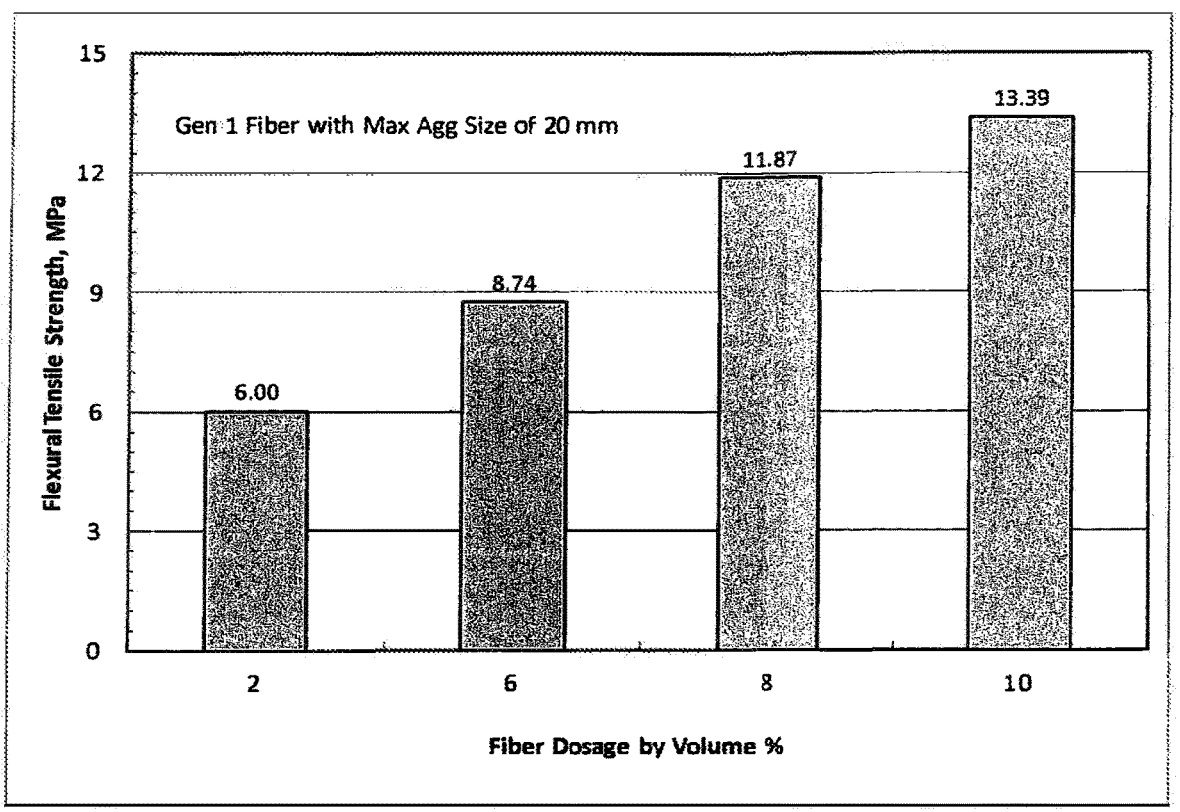
FIG. 8    Flexural Tensile Strength of Normal Concrete with 20 mm Maximum Aggregate Size

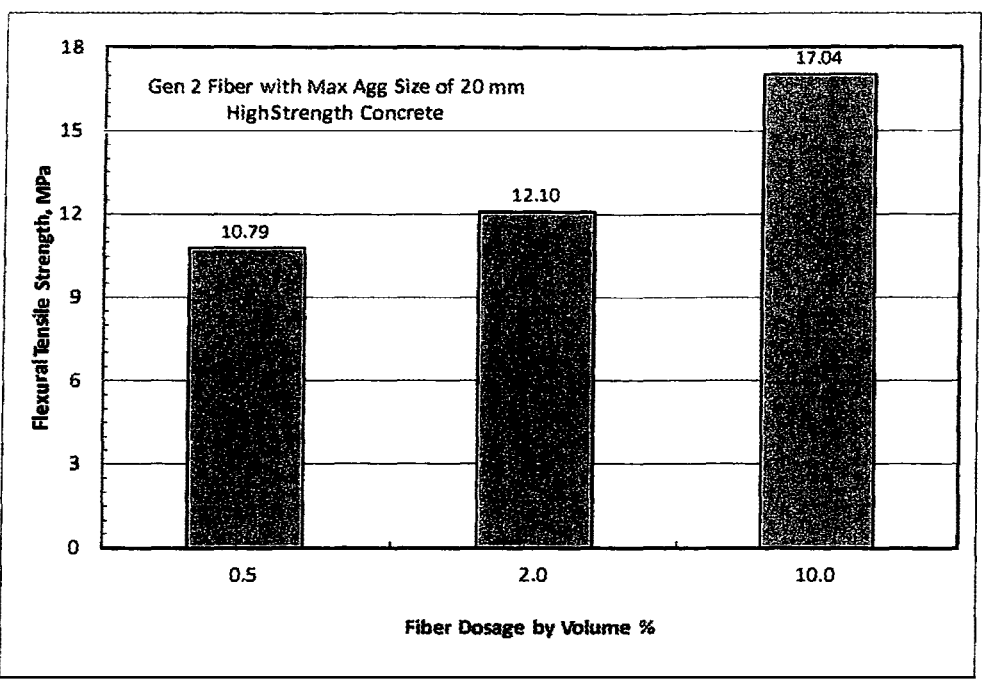
FIG. 9    Flexural Tensile Strength of High Strength Concrete with 20 mm Maximum Size
Aggregate (New Tests)
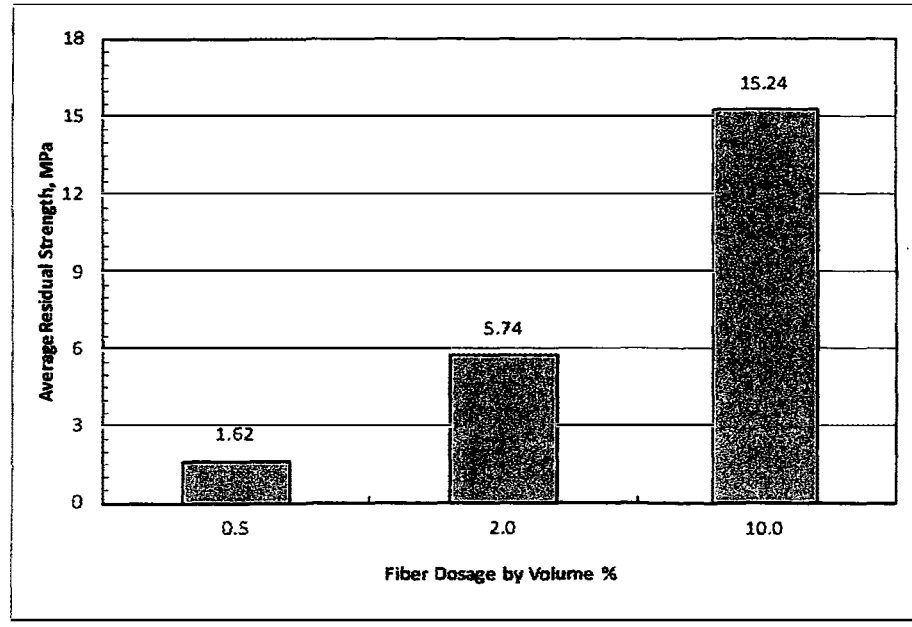
FIG. 10    Average Residual Strength of High Strength Concrete with 20 mm Maximum Size
Aggregate (New Tests)

| SI Units | Dry Mix Gen 2 (0.75%) | Dry Mix Gen 2 (1.5%) | Dry Mix (Series 4) | Dry Mix (Series 1) | Dry Mix (Series 2) |
|---|---|---|---|---|---|
| Fiber Dosage % by Volume (V$_f$) | 0.75 | 1.5 | 1.89 | 1.89 | 1.89 |
| Fiber Dosage (kg/m$^3$) | 13.5 | 27 | 34 | 34 | 34 |
| Concrete Compressive Strength, MPa | 47.1 | 51.9 | 96.8 | 64.2 | 88.1 |
| Flexural Tensile Strength (MPa) | 8.02 | 8.41 | 7.48 | 7.06 | 7.33 |
| Average Residual Strength (MPa) | 1.08 | 2.63 | 5.84 | 5.67 | 6.11 |
| | | | | | |
| Predicted Modulus of Rupture (ACI Equation), MPa | 4.27 | 4.49 | 6.13 | 5.05 | 5.85 |
| Predicted f$_r$ from Suggested Equation, MPa | 4.66 | 5.01 | 7.54 | 6.21 | 7.19 |
| Predicted ARS from Suggested Equation, MPa | 0.79 | 1.68 | 1.98 | 1.98 | 1.98 |

FIG. 11A        Table 1 Dry Mix Concrete Test Results (Gen 2 in color cells – New Tests)

| SI Units | | Normal Series 1 | Normal Series 2 | Normal Series 3 | Normal Series 9 | Normal* Trial Mix # 5 | Normal Trial Mix # 6 |
|---|---|---|---|---|---|---|---|
| Fiber Dosage % by Volume (V$_f$) | | 2 | 6 | 8 | 10 | 8 | 10 |
| Fiber Dosage (kg/m$^3$) | | 36 | 108 | 144 | 179 | 144 | 179 |
| Concrete Compressive Strength, MPa | | 68.4 | 64.9 | 69.9 | 47.0 | 77.2 | 75.45 |
| Flexural Tensile Strength (MPa) | | 6.00 | 8.74 | 10.51 | 10.67 | 11.87 | 13.39 |
| Average Residual Strength (MPa) | | 3.26 | 6.68 | 9.33 | 10.40 | - | - |
| | | | | | | | |
| Predicted Modulus of Rupture (ACI Equation), MPa | | 5.15 | 5.02 | 5.21 | 4.27 | 5.47 | 5.41 |
| Predicted f$_r$ from Suggested Equation, MPa | | 6.41 | 8.69 | 10.29 | 9.48 | 10.81 | 12.01 |
| Predicted ARS from Suggested Equation, MPa | | 2.10 | 6.30 | 8.40 | 10.50 | 8.40 | 10.50 |

\* Average of two beams only
All others - average of at least three

Table 2 Normal Concrete with Max 20 mm Aggregate Test Results (New Tests in color cells)

FIG. 11B

| High Strength Concrete - SI Units | HS Gen 2 (0.5%) | HS Gen 2 (2.0%) | HS Gen 2 (10.0%) |
|---|---|---|---|
| Fiber Dosage % by Volume (V$_f$) | 0.5 | 2.0 | 10.0 |
| Fiber Dosage (kg/m$^3$) | 9 | 36 | 179 |
| Concrete Compressive Strength, MPa | 90.0 | 90.9 | 84.0 |
| Flexural Tensile Strength (MPa) | 10.79 | 12.10 | 17.04 |
| Average Residual Strength (MPa) | 1.62 | 5.74 | 15.24 |
| | | | |
| Predicted Modulus of Rupture (ACI Equation), MPa | 5.88 | 5.91 | 5.68 |
| Predicted f$_r$ from Suggested Equation, MPa | 6.24 | 7.36 | 12.65 |
| Predicted ARS from Suggested Equation, MPa | 0.53 | 2.10 | 10.50 |

Table 3 High Strength Concrete with Max 20 mm Aggregate (New Tests in color cells)

FIG. 11C

REINFORCEMENT BAR AND METHOD FOR MANUFACTURING SAME

CROSS REFERENCE TO RELATED APPLICATIONS

The present application is a divisional of U.S. patent application Ser. No. 13/825,788 filed on May 29, 2013, which is a National Stage of International Application No. PCT/N02011/000300 filed on Oct. 21, 2011, which claims the benefit of Norwegian Patent Application No. 20101485 filed on Oct. 21, 2010. The entire disclosures of which are incorporated herein by reference.

THE TECHNICAL FIELD OF THE INVENTION

The present invention relates to a reinforcement element for use in connection with structures to be cast, such as for example concrete structures.

More specifically, the present invention relates to reinforcement bars for concrete structures and a method for manufacturing such bars, comprising a large number of continuous, parallel fibers, slightly tensioned to work together, preferably made of basalt, carbon, glass fiber, or the like, embedded in a cured matrix, the bars preferably having an average length of 20 mm to 200 mm, and an average diameter of 0.3 mm to 3 mm, each bar being made of at least one fiber bundle comprising a number of parallel, preferably straight fibers having a cylindrical or oval cross section and said bars being provided with a surface shape and/or texture for bonding properties.

BACKGROUND FOR THE INVENTION

Plain concrete is strong in compression, but is very weak in tension, resulting in low tensile strain failure. Therefore, it is an established practice to add small length fibers to concrete at the time of mixing the ingredients of concrete. The fiber mixed with the concrete during the mixing will disperse in all directions in a random manner and provide reinforcing effect in all directions within the cured, hardened concrete. Addition of fiber will change the cracking mode from macro cracking to micro cracking. By modifying the cracking mechanism, the macro cracks become micro cracks. Crack widths are reduced and the ultimate tensile cracking strains of the concrete are increased. The mechanical bond between the embedded fiber and binder matrix provides for this redistribution of stresses. Additionally, the ability to modify cracking mode results in quantifiable benefits, reducing micro cracking that leads to reduced permeability and increased surface abrasion resistance, impact resistance and fatigue strength. This type of concrete is known as fiber reinforced concrete.

The use of corrosion resistant fiber reinforced polymer (FRP) reinforcement has also previously been proposed for transportation structures particularly those exposed to deicing salts, and/or located in highly corrosive environment. Glass, carbon and aramid fibers are commonly used in the manufacture of reinforcing bars for such concrete applications.

Recent developments in fiber production technology allow the making of basalt fiber reinforcement polymer bars (BFRP), manufactured from basalt fiber which is made from basalt rock. Basalt fibers have good range of thermal performance, high tensile strength, resistance to acids, good electro-magnetic properties, inert nature, resistance to corrosion, radiation and UV light, vibration and impact loading.

BFRP products are available in a variety of forms, such as, straight rods, loops, two-dimensional mesh, and spirals.

Other areas of use of fibers for reinforcing structures are concrete layers or linings to be used on tunnel walls, either to prevent rock from falling down or as a fire preventing means. Such concrete are shot on to the surface and is commonly denoted as gunite or shotcrete as well as precast concrete slabs or pre-fabricated concrete elements.

In order to prevent the consequential effects of creep during the curing stages, i.e. to prevent formation of minute or larger cracks during the curing stage, fibers have been used. One type of fibers used is steel fibers having a length in the region of 2-5 cm and a diameter of approximately 1 mm. In order to provide sufficient bonding with the concrete, the ends of such fibers are made flat, thus providing extended heads. The purpose of said steel fiber reinforcement is to prevent cracking during the curing stage of the green concrete.

Also fiber reinforcements made of a large number of parallel glass, aramid or carbon fibers embedded in a matrix and cured have previously been proposed used instead of or in addition to steel fibers.

GB 2 175 364 A relates to a reinforcement member in the form of long, straight, elongate continuous reinforcement rods or bars, having at least one projection on its surface, which is formed by wrapping a cordlike material on the circumferential surface of a fiber-reinforced synthetic core. The cord-like material is formed by twisting continuous fiber bundles at a pitch in the range of three turns per ten cm to fifteen turns per ten cm. The fiber bundles comprise glass, or carbon, or boron, or metal, or natural or synthetic fibers.

U.S. Pat. No. 5,182,064 describes a method for producing a long, elongate fiber reinforced plastic rod having ribs on its surface by impregnating a reinforcing material which has continuous long fiber bundles with an uncured liquid resin. A rib forming member is separately prepared by impregnating a fiber bundle reinforcement material with an uncured liquid resin. A fiber reinforced plastic rod is formed by helically applying the rib forming member and together curing the two members into an integral body.

JP 4224154 describes a reinforcing member for concrete having high restraining adhesion strength and tensile strength by winding thick threads and fine threads around a core material comprising reinforcing fiber and thermosetting resin, and hardened and cured while forming a rugged coating layer with a thermo setting.

JP describes how to improve the reinforcing strength of cement by forming outwards projecting ring shaped projections, or flatten ends, on elongate fiber bundles, embedded in a very sticky material, cutting these into short fiber bundles arranged in one direction and embedded in a resin matrix.

JP 1207552 describes a solution where a thermoplastic resin is reinforced with bundles of reinforcing fiber oriented in one direction, and thereto a bending process is applied. Where bending process is to be applied, a yarn consisting of the same fiber as the mentioned reinforcing fiber is wound round, and powder consisting of silicon carbide, aluminum oxide, stainless steel, etc., with rich attaching property to concrete is affixed to the peripheries of rod in order to increase the attachment strength of a reinforcing member to the concrete.

CN 2740607 discloses a reinforced fiber structure for concrete. The fiber is a high polymer fiber which is provided with a rough surface. The cross-sectional shape of the reinforced fiber structure can be a six-leaf shape or a five-leaf shape. A profile shape may be a wave shape or a saw-tooth shape. The diameter of the fiber is between 0.5 mm and 1.0 mm. The length of the fiber is between 40 mm and 75 mm. The fiber structure has high tensile strength, low elastic modulus, strong acidity and alkalinity resistance and a light specific gravity. The fiber is used for controlling cracks in the concrete during the curing stage.

CN 201236420 discloses rib material that can be used in construction instead of reinforcing steel bars. The fiber composite rib material is a bendable cylindrical sectional bar formed by gluing and compounding a plurality of basalt fiber core bundles and a resin substrate coating the basalt fiber core bundle. The bars are long units of a similar size as conventional reinforcement bars of steel.

EP 2087987 discloses a method and a device for introducing longer steel fibers in concrete using a device mounted on or close to a concrete nozzle, where the fibers are cut and shot into the concrete flow through a pipe, directly into the concrete mixer.

JP2007070204 and JP 2008037680 describe a carbon fiber bundle in the form of a piled yarn of two or more carbon fiber bundles. The carbon fiber bundle is twisted 50-120 per meter and has a length in the order of 5-50 mm. The carbon fiber bundle surface has corrugated interval of 3-25 mm. The flat carbon fiber bundle having width/thickness ration of 20 or more, is twisted and processed. The cross sectional are of the wire is 0.15-3 mm.

WO 98/10159 describes fibers, continuous or discontinuous, and bars having optimized geometries for use in reinforcement of cement, the cross-sectional are of which is polygonal. The geometries are designed to increase the ratio of surface area available for bond between the fiber and the matrix to the cross-sectional area of the fiber.

US 2001/0051266 and US 2004/0018358 describe fibers which are micro-mechanically-deformed such that the fibers are flattened and have surface deformations for improved contact with the matrix material, the matrix material inter alia may be concrete. The fibers have preferably a length in the region 5-100 mm and an average width of 0.5-8 mm, the fibers being made of one or more synthetic polymers or metal, such as steel.

WO 02/06607 describes fibers to be used in concrete mixtures, the fibers being flat or flattened and have a first and second opposed flat or flattened end that are twisted out of phase and which define there between an intermediate elongate, helical fiber body. The fibers have an average length of about 5-100 mm and average width of 0.25-8.0 mm and average thickness of 0.00-3.0 mm. The fibers are made of polypropylene or polyethylene.

Reference is also made to WO 2003/025305, belonging to the applicant, such publication being included by the reference both with respect to the method of fabrication and to the configuration and built-up of elongated composite reinforcement bars.

It is a need for an improved type of reinforcement which in a simple manner is suitable for repairing conventional cracked concrete structures, reinforced with conventional steel reinforcement such that exposed steel reinforcement may be sealed off and in addition restore and possibly providing added structural integrity of the cracked concrete structure.

It is further a need for providing reinforcement for concrete structures avoiding the need of complex or conventional reinforcement placed in situ, basing the reinforcement on more or less randomly placed reinforcement within the green concrete, reducing the requirement of or at least part of the conventional reinforcement.

Further, there is a need for an effective and improved method for producing the short fiber bars and for improving the bonding effect between the surrounding concrete and the short bars.

There is also a need for a short bar reinforcement which contributes to the concrete strength also at the stages subsequent to completed curing of the concrete.

It should also be appreciated that there is a need for a reliable, maintenance free reinforcement where access is limited for installation of bar reinforcement or for use in processes where the automated machinery limits the opportunity to use straight bar reinforcement or prefabricated or in situ placed reinforcement cages, including structures such as slabs, pipes, drainage culvers, pavement, sea anchors, etc.

In most of the documents referred to above, the plastic fibers used is chosen from a group having a specific weight contributing to a total specific weight of the fibers, i.e. fiber and matrix, which is less than 1, thus giving short bars a tendency to float up towards the upper surface in the pouring process. Further, plastic fibers of the prior art have also a tendency to absorb water, causing dehydration in a casting phase where there is a need for a surplus of water to achieve a proper curing of the concrete.

When pouring the concrete, the prior art plastic fibers have a tendency to float up towards the surface when leaving the chute. Further, the conventional steel fibers have a tendency to ball up during mixing and pouring, resulting in clogging, and is also hard to mix due to the water absorbance tendencies, having a negative effect on the dehydration and curing process of the poured concrete. These negative effects reduce the range of volume fraction steel and plastic fiber can be used across. The advantage of the basalt MiniBars™ according to the present invention, is the density and the non-water absorption, allowing mixing in ranges up to 10% volume fraction (VF), which otherwise would have been impossible using conventional fibers.

SUMMARY OF THE INVENTION

A key object of the present invention is to increase the tensile strength of fiber reinforced concrete upwards to 15 MPa in flexural tensile strength using ASTM Testing Methods and also residual tensile strength, and to transform the compressive failure mode to plastic versus brittle, reducing the volume fracture to preferably below 10, thus establishing a very efficient reinforcement.

It is also an object of the present invention to provide a MiniBar™ reinforced concrete having very good flexure toughness and energy absorption capabilities after cracking. The definition of MiniBar™ comprising short basalt, carbon or glass fiber reinforcement bars, formed of a number or substantially parallel fibers embedded in a suitable matrix, and comprising a helix wound around the embedded fibers, forming helically arranged indents extending circumferentially in a continuous manner along bar, the bar having with a length in the region of 20 to 200 mm and a diameter in the region of 0.3 mm to 3 mm and possibly with a roughened surface as further referred to below, hereinafter referred to MiniBar™.

Another object of the present invention is to provide a reinforcement being active both during the curing stage as inherent crack control and during the life of the concrete structure, having load bearing and distributing properties also subsequent to completed curing, thus improving the structural integrity of such concrete structures.

Another object of the present invention is to provide a reinforcement element which reduces the extent of preparatory work on damaged concrete structures in order to repair damages on such structures.

Another object of the present invention is to provide a method for producing such bar reinforcement with enhanced bonding qualities and properties when used in concrete.

Another object of the present invention is to provide a reinforcement system that also may be used in concrete structures such as sea walls where the improved concrete strength in tension would eliminate the need for the light or moderate steel or other type of reinforcement.

Another object of the present invention is to provide a FRP reinforcement consisting of short bars which do not contribute in a negative manner to the curing process of the concrete while at the same time enhancing the bonding effect and bonding mechanism with the surrounding concrete.

It should be appreciated that steel fibers will due to its lack of corrosion resistance gradually lose its reinforcing strength. Hence, another object of the present invention is to provide an alkali resistant reinforcement fiber.

A still further object is to provide a MiniBar™ reinforcement which allows for random placing in the mix and which is not influenced by use of vibrators for vibrating the green concrete.

A further object of the present invention is to provide a reinforcement which is suitable for reinforcing structures which are otherwise difficult to access, such as deep foundation in excavation, foundation piles or diaphragm walls.

Another object of the invention is to provide a MiniBar™ reinforcement, the position of which is not affected when the green concrete is vibrated due to the density.

Another object of the present invention is to provide a reinforcement system where the reinforcing effect of the fibers and conventional reinforcement in the form of reinforcement bars or loops work together over the entire cross sectional area of a concrete structure, and also preventing formation of cracks of the concrete and/or surface spalling subsequent to completed curing of the concrete. In such case the fiber reinforcement and the reinforcement in the forms of bars, loops or pre-stressing reinforcement function as an integrated reinforcement.

Another object of the present invention is to provide a reinforcement system reducing the required labor cost and maintaining a feasible level of workability of the green concrete.

Yet another object of the present invention is to provide reinforcement elements which are configured in such way that when a concrete structure, reinforced with the reinforcement elements according to the invention is subjected to loads and forces, the failure shall be by loss of bonding between a reinforcement element and not by breaking the MiniBar™, allowing the concrete to fail or crack but not the MiniBar™ itself, thus giving the concrete structure post cracking strength related to the good bond strength.

Yet another object of the present invention is to provide improved, short bars which do not clog during mixing with green concrete and which do not sink or float up in a mixed, green concrete batch during mixing or pouring.

The objects are achieved by use of short MiniBar™ reinforcement as further defined by the independent claims. Possible embodiments are defined by the dependent claims.

Yet another object of the present invention is to provide MiniBbar™ reinforcement where the diameter and the bond strength, which are critical dimensions for obtaining the strength, are combined in such way that the required flexural and residual tensile strength exceeds 15 MPa.

According to the present invention the MiniBars™ also are intended to eliminate the need for steel or basalt fiber reinforcement polymers in some applications, such as shear reinforcement.

The above objects are achieved by a reinforcement bar and a method for using and producing such bars as further defined by the independent claims. Optional embodiments of the invention are defined by the dependent claims.

According to the present invention, the reinforcement bar for concrete structures, comprises a large number of continuous, parallel fibers, preferably made of basalt, carbon, glass fiber, or the like, embedded in a cured matrix. The bars may preferably have an average length in the range of 20 mm to 200 mm, and an average diameter in the range of 0.3 mm to 3 mm and each bar may be made of at least one fiber bundle comprising a number of parallel, preferably straight fibers having a cylindrical cross section, the cross section preferably being more or less circular or oval. At least a part of the surface of each bar may be deformed prior to or during the curing stage of the matrix by means of:

a) one or more strings of an elastic or inelastic, but tensioned material being helically wound around said at least one bundle of parallel, straight fibers prior to curing of the matrix in which the fibers are embedded, maintaining the fibers in an parallel state during curing and providing an uneven external surface with longitudinally arranged helical indents in a longitudinal direction on the surface of the matrixed fiber bundle(s) of the reinforcement bars, and/or b) that said bars being provided with a surface shape and/or texture which contributes to good bonding with the concrete;

thereby providing a roughened surface.

According to one embodiment of the invention, said two or more strings may be helically wound in opposite direction around the matrix embedded fiber bundle(s).

Further, the mini bars may preferably be made of basalt fibers, carbon, glass or the like.

It should be appreciated that the pitch length of the helix is in the range of 10 mm to 22 mm, and preferably be around 17 mm to be matched with grade of concrete and aggregate size, while the angle of the helix with respect to the center line of the mini bar fiber may preferably be in the range from 4 to 8 degrees, while the angle of the parallel fibers with respect to said center line of the mini bar fiber should be between 2 and 5 degrees.

The invention comprises also a method for manufacturing reinforcement bars. Each bar may comprise a large number of continuous, parallel fibers, preferably made of basalt, carbon, glass fiber, or the like, embedded in a cured matrix, the bars preferably having a length in the range 20 mm to 200 mm, and a diameter in the range of 0.3 mm to 3 mm. Said bars may be made of at least one fiber bundle, which prior to or during the curing process are provided with a surface texture contributing to good bonding with the concrete, said surface texture is obtained by helically winding one or more strings of an elastic material around said at least one bundle of parallel, fibers the fibers also being straight.

According to one embodiment, at least one helically string is wound prior to curing of the matrix, holding the fibers in an parallel state during curing and providing an uneven external surface in a longitudinal direction of the reinforcement bars. Two or more such strings may be used, for example wound helically in opposite direction.

The helical winding may be wound with an angle in the range of 4 to 8 degrees, with respect to the center line of the elongate mini bar.

Such fibers may be randomly mixed with green concrete and used for repair work of cracked concrete and also for providing average residual strength and flexural strength in the cured concrete structures, thereby restoring or improving the structural integrity of the concrete structure.

According to one embodiment of the invention, the reinforcement bar comprises a large number of continuous, parallel fibers, preferably made of basalt, embedded in a cured matrix, the bars preferably having an average length in the range of 20 mm to 200 mm, and an average diameter in the range of 0.3 mm to 3 mm. Each bar may be made of at least one fiber bundles comprising a number of parallel, preferably straight fibers having a more or less cylindrical or oval cross section and being provided with a surface shape and/or texture which contributes to good bonding with the concrete.

At least a part of the surface of each bar being deformed prior to or during the curing stage of the matrix by means of:

a) one or more strings of a string material being helically wound around said at least one bundle of parallel, straight fibers prior to curing of the matrix in which the fibers are embedded, maintaining the fibers in an parallel state during curing and providing an uneven external surface in a longitudinal direction of the reinforcement bars, and/or b) at least one deformed section and/or possibly at least one end of each reinforcement bar; thereby producing a roughened surface and/or such deformations may be any deformations or dents or shapes preventing or at least substantially restricting pull out.

It should also be appreciated that a thinner basalt fiber used as helix around the main basalt fiber bar will increase the strength of the MiniBar™.

According to a further embodiment, one, two or more strings are helically wound in opposite direction, said one or more strings creating the indentations required according to the present invention.

According to the present invention, said helically arranged indents are provided by twisting a thread or fiber unit helically around the bundle of impregnated, more or less uncured fibers, applying a higher tension in said thread than in the bundle, thereby providing a twist in the bundle and/or a helically arranged indent extending along the entire length of the bundle and/or the short cut-off bars as the case may be.

Alternatively or in addition, the exterior surface of the bar may be provided with at least one enlarged or flatten portion or having varying diameter, such surface being provided prior to the curing phase, thereby providing a better bonding with the concrete.

Each bar may also have a deformed middle section or ends, increasing the contacting surface area of bar.

In a preferred method for manufacturing reinforcement bars as further defined above said surface texture is obtained by helically winding one or more strings of an elastic or inelastic material around said at least one bundle of parallel, fibers the fibers also being straight. At least one helically string may preferably be wound around the fibers and matrix prior to curing of the matrix, holding the fibers in an parallel state during curing and providing an uneven external surface in the form of helically extending indents in a longitudinal direction of the reinforcement bars. Alternatively, two or more strings may be helically wound around the fibers and matrix in opposite directions, the tension in such string(s) being higher than the tension used for pulling the bundle along the production line towards the curing and hardening stage.

The exterior surface of the bar may further or instead be provided with at least one enlarged or flatten portion or having varying diameter, such enlarged or flatten portion being formed prior to the curing phase, thereby providing a better bonding with the concrete.

The bars according to the present invention may be mixed with green concrete and used for repair work of cracked concrete, also for providing average residual strength and increased flexural strength in the cured concrete structures, thereby restoring or improving the structural integrity of the concrete structure.

Possible other areas of use are concrete floors in buildings, either prefabricated or in situ concreted; concrete paving stones which may be made thinner and lighter due to the strengthening effects of the basalt MiniBars™, etc. Another area of use is as concrete for producing clamps or weights holding sea pipelines down on the sea bed.

Other type of use of the MiniBars™ according to the present invention may for example, but not exclusively, be very suitable for use on structures that are exposed to liquids and in particular to water having a ph below seven or water containing salt. Such structures may for example be structures for sea defense and portions of jetties/quay walls below or exposed to a waterline, pillars for bridges, concrete barges or the like. The reinforcement may also be used on land based structures where access to install conventional reinforcement is difficult. Such application may for example be deep foundations in excavations or diaphragm wall, piles, or the like.

It should be noted that the basalt MiniBar™ reinforcement may be added to the green concrete during mixing, delivered by trucks. Alternatively the MiniBar™ reinforcement may be delivered in dry concrete for pavement stones and drainage culverts, etc.

The material used for establishing the helical pattern of the bars may for example be an elastic or in-elastic thread. As an alternative, basalt fiber threads may also be used since such helix also may contribute to both strength and stiffness of the MiniBars™.

Further, it should also be appreciated that the MiniBars™ in addition may be coated with a layer of randomly arranged particulate material, such as sand, glass or similar type of hard materials.

According to the present invention the MiniBars™ are evenly mixed in the green concrete, randomly orientated. The MiniBars™ have a similar density to the concrete, although not exactly the same. Consequently the MiniBars™ do not float up nor sink in the green concrete and without being affected by vibrating of the concrete, i.e. neither migrating up to the top of or down to the bottom of the green concrete when the concrete is vibrated.

The behavior of the MiniBars™ in the concrete is considered to be dependent on both the concrete properties and the distribution of the MiniBars™ in the concrete. The concrete properties may be important because the bars are short compared to their diameter, and so do not develop a full anchoring in the concrete. Therefore, the forces that can be mobilized in the bars are very dependent on the concrete strength and the resulting bonding stress developed between the concrete and the bars. Distribution of the MiniBar™ in the concrete is important because relatively small number of bars are used in the mix, compared with conventional fibers. This relatively small number of bars means that minor variation in distribution through the mix could have a notable effect on the strength.

Further, the size of the aggregates used in the concrete mix may have an effect on the strength of the cured concrete structure. Smaller aggregate size mixed with the MiniBars™ according to the present invention have affected the quality of the bar distribution and consequently improved the concrete strength.

According to the present invention the helix around the straight fiber bundle may be beneficial. More or less randomly positioned MiniBars™ according to the present invention will act like shear links in the concrete structure, bridging and improving the shear strength of the concrete. The MiniBars™ according to the present invention may also be a supplement conventional reinforcement, either conventional longitudinal flexural steel or basalt or carbon fiber reinforcement bars or cages, the MiniBarsrm functioning at least as shear reinforcement, for example to reduce the required fixing time by the reinforcement fixers.

A unique advantage obtained by use of the MiniBars™ according to the present invention, is that tests has demonstrated that the relevant residual strength requirements, based on ASTM C1609 tests (as specified in ACI 318-08 for steel fiber reinforced concrete) for using the MiniBars™ according to the present invention as shear reinforcement in reinforced concrete slabs and beams. Such type of fibers are of a corrosion free, alkaline resistant, structural fiber type.

The basalt fiber reinforcement bars according to the present invention have the following bonding mechanisms:

On the macro scale, the controlled pitch of the basalt fiber and the helix thread twist in a range of 10 to 22 mm. The bonding will be between the aggregates of the concrete, such aggregate having irregular shape which will hook or create a friction and/or mechanical bond with the indents in the mini bar surface and with the other surrounding aggregates in the concrete, securing a proper bonding effect. In addition the fine sand particles and the cement particles lying in between the larger aggregates will also contribute to this bonding effect. If the pitch length of the mini bars according to the present invention, i.e. the distance or length of one turn of the thin helical string, is too large and/or to straight, i.e. very large pitch, the MiniBars™ will be pulled out, while if said distance or length is too small, the minibar according to the present invention will breaks and/or crush fine particles surrounding, adjacent cement, such particles mainly being fine particles due to the reduces volume of indents per length of the bar.

On the micro scale, the surfaces of the discrete basalt fibers will be roughened due to the tiny longitudinal indents formed between the parallel fibers in the bundle, forming a bonding effect between the fine particles in the concrete, allowing and providing strong interlocking micro bonding effect between the small aggregate and fines in concrete and the MiniBar™.

One feature of the RFT process is to be able to match the helix pitch length (see FIG. 3) to fit the largest aggregate size such that the MiniBar™ and aggregate can interlock in the most efficient manner, ie, smaller pitch lengths to match smaller aggregate mixes.

The chemical bond of the concrete with the thin layer of the matrix and outermost strands of the basalt fiber will also contribute to the bonding effect between the fibers and the surrounding concrete.

The above bonds are directly with the straight basalt fibers with small twist encased and joined by matrix. The bond does not rely on the addition of sand particles which has been shown to shear off the vinyl ester coated bars. Further, the bond does not rely on a bond with an externally added and "glued"-on ring of secondary material as proposed in the prior art. The MiniBar™ bond is in the direction of the fibers, and both the fibers and the indents made by the helically twisted thin thread allow for a good mechanical linkage between the reinforcement bar and the surrounding concrete over the entire length of the MiniBar™.

It should be appreciated that in order to provide the roughened surface of the MiniBars™ according to the present invention, the weight factor of the fibers in respect to the weight factor of the matrix should preferably be in the range of 65 to 85, more preferably in the order of 70 to 77, and most preferably around 75. If the weight factor of the matrix used is too high, the fine indents between the fibers at the surface of the Minibar™ will be filled with matrix, thus reducing the contribution of the aggregate/fines to the micro scale bonding and causing the matrix to be easily pulled off as a "hose". If the volume of the matrix is too small, the shear contribution provided by the bonding between the fibers at the surface and the aggregates and/or fines in the concrete, will be reduced.

Further, the most preferred angle $\alpha$ of the helix with respect to the centerline of the MiniBar™ according to the present invention should preferably be in the region of 4 to 8 degrees, while the angle x of the parallel fibers with respect to said centerline of the MiniBar™ should preferably be in the order of 2 to 5 degrees. The Minibar™ may preferably be produced according to the content of U.S. Pat. No. 7,396,496, the content of which hereby is incorporated by the reference. Tests have proved that the fibres according to the present invention mixes well and stay random in the mix regardless of the spinning speed of the rotating drum of the concrete mixing transport truck. Further, the fibres stay randomly distributed and stay evenly distributed throughout the mixed volume also during pouring.

It should also be appreciated that both the diameter and the bond strength is critical for securing the required strength of the mini fibre reinforcement.

While the prior art solutions rely on the shear strength of the epoxy used as matrix, the fiber bars according to the present invention rely on the shear strength between the sand and the aggregates in the concrete on the one side and the obtained bonding with the surface of the mini bar surface.

The range of diameters is important as the shrinkage in concrete also acts as a clamping mechanism which is stronger on the larger diameters than the small diameters. Testing has shown that as the diameter is reduced the efficiency in clamping as measured as bond in the Flexural Tensile Testing increases, whereas the bond as measured by Average Residual Strength decreases. Implications are that for different strength levels as required during engineering of concrete structures different diameters may be specified to provide the strength level desired or required.

Compared to the dimensions of the MiniBars™ the aggregate may have any normal size commonly used in concrete.

SHORT DESCRIPTION OF THE DRAWINGS

Embodiments of the invention will now be described in further details, referring to the accompanying drawings, wherein:

FIG. 3 shows schematically and in an enlarged scale a portion of one embodiment of a MiniBar™ according the present invention, indicating various angles of importance;

FIG. 4 shows schematically in an enlarged scale a vertical section in axial direction of an embodiment of a MiniBar™ according the present invention, indication the direction of the numerous substantially parallel fibers and indicating the interaction between the aggregates and fines of the concrete on the one hand and the surface and indents of the Mini-Bar™ fiber surface on the other hand;

FIG. 5 shows schematically in an enlarge scale a cross section through a MiniBar™ according to the present application, indication also the indents and the roughened surface;

FIG. 6 shows a graph showing the flexural tensile strength measured in MPa of a dry mix concrete for various fiber dosages by volume %;

FIG. 7 shows average residual strength measured in MPa for a dry mix of various fiber dosages by volume %; and FIG. 8 shows the flexural tensile strength measured in MPa, of normal concrete with 20 mm maximum aggregate size, for different fiber dosages by volume %;

FIG. 9 shows flexural tensile strength of high strength concrete with 20 mm maximum size aggregate, for different fiber dosages by volume %;

Figures 1, 2:
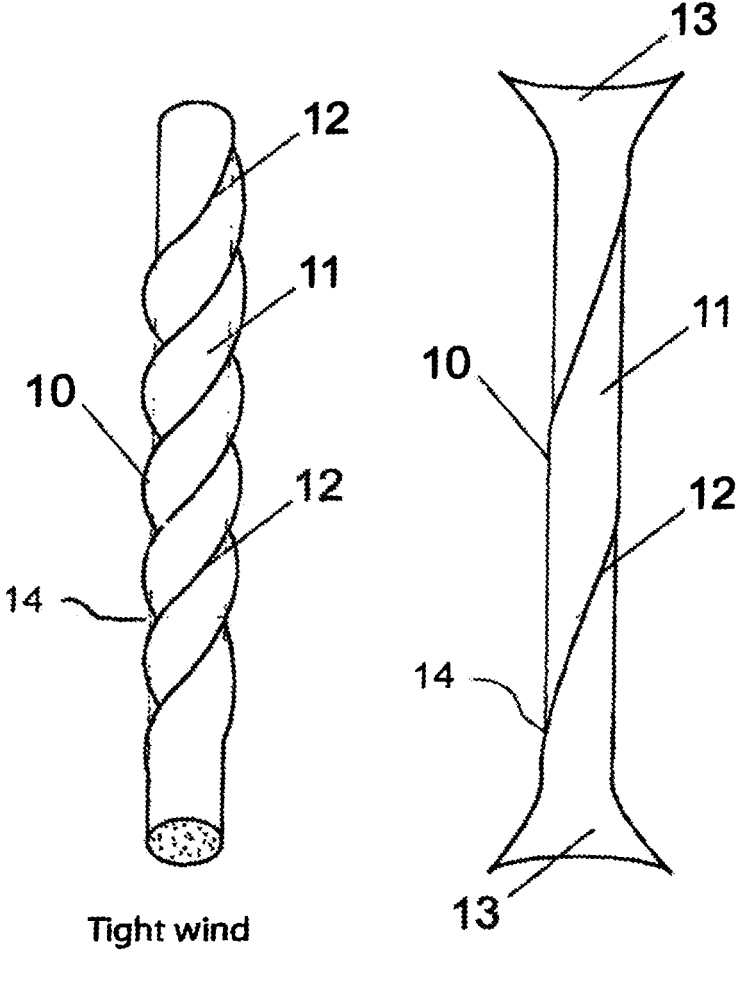
FIG. 1 shows schematically a view of a first embodiment of a MiniBar™ according to present invention, indicating a tight wind.
FIG. 2 shows schematically a view of a second embodiment of a MiniBar™ according to the present invention, showing windings having longer pitch length.

FIG. 10 shows average residual strength concrete with 20 mm maximum size aggregate; and FIGS. 11A-11C are presented on one sheet disclosing the results from tests, shown in FIG. 11A (Table 1), FIG. 11B (Table 2), and FIG. 11C (Table 3), where FIG. 11A (Table 1) discloses the test results for generation 1 and 2 of dry mix concrete; FIG. 11B (Table 2) shows the test results for normal concrete with maximum 20 mm aggregates, the dosage % being the variable; and FIG. 11C (Table 3) shows the test results for high strength concrete with maximum 20 mm aggregate for three different fiber dosage %.

DETAILED DESCRIPTION OF THE DRAWINGS

FIG. 1 shows schematically a view of a first embodiment of a MiniBar™ 10 according to present invention. The MiniBar™ 10 comprises a large number of parallel fibers 11 of basalt, glass fiber or carbon, embedded in a cured matrix of a conventional type resisting alkaline attacks. Such matrix may for example be a thermoplastics, a vinyl ester (VE) or an epoxy. A string elastic or string inelastic 12 is wound continuously around the elongate embedded fibers, applying a certain tension in the string 12 so as to partly deform the circumferential surface of the bar 10, producing elongate helically arranged indents 14. This winding operation is preferably performed simultaneously with or slightly after the embedment process of the elongate fibers 11 in the matrix, but prior to the final stage of the curing thereby securing the required deformation of the circumferential surface of the bars 10. Further, the MiniBar™ 10 may be made as elongate strings or bars in a continuous process, whereupon said continuous bar is cut into lengths preferably in the range 20 mm to 200 mm, while the diameter or thickness of the bars may preferably be in the range of 0.3 mm to 3 mm. The helical may be made of an elastic or inelastic string for example of basalt which, when tensioned in a controlled manner, can create the repeatable and desired surface deformation in the form of indents. Further, the external surface of the MiniBar™ may preferably have a hair like texture, comprising a number of fine, hairs or fiber ends extending out from the MiniBar™ in a random direction. This may be achieved by twisting the large number of parallel basalt fibers embedded in an uncured matrix, preferably as a single bundle, around said fine helical, thus transforming straight fine thread to a helical around the fiber bundle. During the process of establishing the helical, the tension in the fine, thinner helical is controlled with respect to the tension in the basalt fiber bundle. The embodiment shown in FIG. 1 is the primary means for enhancing the bonding with the surrounding concrete is the uneven shape of the MiniBar™ formed by the tensioned helical 12. The difference in tension is maintained in the bar until the matrix is sufficiently cured and hardened. A secondary means is the bonding to the concrete at the microscopic level with the rough surface created by the fibers protruding partly from the matrix.

FIG. 2 shows schematically a view of a second embodiment of a MiniBar™ 10 according to the present invention. According to this embodiment the MiniBar™ 10 is provided with a helical 12 as shown in FIG. 1. In addition the two ends 13 are deformed/flattened so as to increase the end contact area, thereby enhancing the bonding properties and shear resistance capacity of the MiniBar™ 10 with respect to the surrounding concrete. Although a helical 12 is shown, it should be appreciated that the MiniBar™ 10 may be without such helical 12, the deformed or flattened ends securing the required bonding and shear resistance capacity, ref FIG. 3, showing schematically a view of a third embodiment of a MiniBar™ 10 according to the present invention, deformed at each end and without a helical 12.

FIG. 3 shows schematically and in an enlarged scale a portion of one embodiment of a MiniBar™ according the present invention, indicating various angles of importance. As shown the bar 10 comprises a large number of substantially parallel fibers 17, embedded in a suitable matrix, the bar 10 being provided with a helically wound string 12, tensioned so that the helical string 12 forms elongate helically extending indents 14 along the length of the bar 10. As indicated in the Figure, an angle α is used to define the angle between the centerline CL of the bar 10 and the projected angle of the helix 12 in the paper plane. Such angle α should preferably be in the range between 4 and 8 degrees. Further, the Figure also shows the angle β between the centerline CL of the rod and the longitudinal direction of the fibers 17. As specified above the angle β should be in the region between 2 and 5 degrees. The optimum is a balance in tension between both fibers and a common angle of 4 to 5 degrees to the centerline for both fibers. It should be appreciated that the FIG. 3 is exaggerated and distorted so as to indicate the various forms emanating from the tensioned helix. It should be appreciated that the surface between the helix is slightly given a helically arranged convex outer surface. The length L between two consecutive indent points in the axial direction of the bar defines the pitch length of the helix.

FIG. 4 shows schematically in an enlarged scale a vertical section in axial direction of an embodiment of a MiniBar™ 10 according to the present invention, indicating the direction and path of the numerous, substantially parallel fibers 17 and also indicating the interaction between the aggregates 16 and fines of the concrete 15 on the one hand and the surface and indents 14 of the MiniBar™ fiber surface on the other hand. It should be appreciated that from a clarity point of view only a part of the surrounding concrete 15 is shown, the fibers 10 being randomly arranged in the concrete.

FIG. 5 shows schematically in an enlarge scale a cross section through a MiniBar™ 10 according to the present application, indication also the indents 14, the helix 12 and the roughened surface of the bar 10. It should be appreciated that the roughened surface is established by the parallel fibers 17 and elongate small indents between adjacent fibers 17.

Normally, the range for adding crack control products is less than 2%, while according to the present invention the range of added dosage of MiniBars™ is in the range of 0.5% to 10%. Test have shown that using MiniBar™ reinforced concrete within the above identified range of added Mini-Bars™, demonstrated no difficulty in concrete mixing. There was no bleeding, balling or segregation in the concrete, demonstrating that it is feasible to mix MiniBars™ in concrete without any difficulty. Test have proved that such concrete was handled, placed, consolidate and finished normally without additional precautions, thus demonstrating that good workability can be achieved due to the density of MiniBars™.

Tests have been performed to validate and verify the improvements to the concrete. The tests showed that compressive strength according to ASTM C39ASTM C39 of cylinders reinforced with MiniBar™ reinforced concrete according to the present invention, demonstrated ductile failure with the cylinders still intact after failure while normal non-reinforced cylinders would shatter due to brittle failure.

FIG. 6 shows a graph showing the flexural tensile strength measured in MPa of a dry mix concrete for various fiber dosages by volume %. The graph shows the testing of two generation fibers in a dry mix. The main difference between the two generations fibers are the fiber diameter and the pitch length of the helix. In the first generation the fiber dosage by volume was constant, i.e. 1.89 volume %, while in the Gen. 2 the fiber dosages were 0.75 and 1.5 respectively. As shown, the residual strength for both Gen 2 was higher then the corresponding results for Gen 1, in spite of a reduction in fiber dosage due to efficient use of materials and the high tensile strength of the basalt.

FIG. 7 shows average residual strength measured in MPa for a dry mix concrete using various fiber dosages by volume %. The low average residual strength is the result of fewer MiniBars™ across a given crack face.

FIG. 8 shows the flexural tensile strength measured in MPa, of normal concrete with 20 mm maximum aggregate size, for different fiber dosages by volume %, varying from 2 to 10 volume % and a more or less linear increase in flexural tensile strength for increasing volume percentages, FIG. 9 shows flexural tensile strength of high strength concrete with 20 mm maximum size aggregate, for different fiber dosages by volume %, varying from 0.5 to 10.0, a 17.04 MPa flexural strength being achieved when using a dosage of 10 volume %. Correspondingly, FIG. 10 shows average residual strength concrete with 20 mm maximum size aggregate, obtaining an average residual strength of 15.24 when using a fiber dosage of 10.0 volume %.

The Figures also include one sheet disclosing the results from tests, shown in Table 1, table 2 and Table 3. Table 1 discloses the test results for generation 1 and 2 of dry mix concrete; Table 2 shows the test results for normal concrete with maximum 20 mm aggregates, the dosage % being the variable; and Table 3 shows the test results for high strength concrete with maximum 20 mm aggregate for three different fiber dosage %.

The flexural tensile strength (modulus of rupture) was tested per ASTM C78-07 for MiniBars™ according to the present invention in volume percentages from 0.75% up to 10% with results in flexural tensile strength increasing from 6 MPa up to 17.05 MPa depending on volume fraction used over a zero MiniBar™ result of 5.2 MPa.

The average residual strength increased from zero for normal un-reinforced concrete up to 5.8 to 15.24 MPa, (474 psi to 1,355 psi), depending on volume fraction of Mini- Bars™ used. These values are significantly greater than those expected for plain concrete of similar compressive strength. The following correlation between flexural tensile strength ($f_r$), MiniBar™ dosage by volume ($V_f$) and ($f_c$) is the compressive strength of concrete, determined by using standard cylinder tests for (all units being MPa units):

$$f_r = (0.62 + 0.076\ V_f)\sqrt{f_c}$$

The average residual strengths (ARS) obtained for Mini-Bar™ reinforced concrete according to the present invention were much greater than expected, suggesting that the Mini-Bar™ have significantly helped in the post-cracking performance of concrete in the current test program.

The Average Residual Strength ARS=1.95 $V_f$, where $V_f$ is the MiniBar™ dosage in percent by volume and $f_c$ is the concrete compressive strength.

In order to improve the bonding between the MiniBars™ and the concrete in which the MiniBars™ are embedded, the surface of the MiniBars™ may be provided with a randomly arranged particulate material, such as for example sand. It should also be appreciated that the MiniBar™ may be provided with a longitudinal opening extending axially through the MiniBar™ thus securing a tubular MiniBars™ to increase bond area. It should also be appreciated that the MiniBar™ is thicker than conventional steel or plastic material fibres used and is suited to experience higher compression forces, due to concrete shrinkage on a larger diameter.

The specific gravity p of steel is in the order of 8 g/cm³, while the specific gravity p for concrete is around 2.3. The specific gravity of the MiniBar™ reinforcement is in the region 1.9. As a consequence, the MiniBar™ does not sink nor float up towards the surface of the concrete mix during casting or concreting, since the specific gravity of the basalt fibres corresponds more or less to the aggregates used in the concrete.

The process for manufacturing the MiniBars™ according to the present invention, comprises the following steps:

A number of continuous basalt fibers are assembled in parallel and embedded in a matrix of vinyl ester. During this phase, the fiber bundle is pulled forward, subjected to a pulling tension, forming a straight body, the matrix still being uncured and soft. The fibers are delivered from reels into a wetting chamber.

One or more separate strings are helically wound around the straight, matrix embedded bundle while the bundle and matrix still are relatively soft, said one or more separate strings being subjected to a higher tension than the tension caused by the pulling forward of the matrixed fiber bundle. Due to said higher tension, said one or more separate strings will formed helically extending indents in the surface of the matrix embedded fiber bundles.

Thereupon, the matrix embedded bundle and said one or more helically wound, more or less embedded strings enter a curing stage where the fiber bundle with its helical string(s) are cured and hardened.

Due to said higher tension in said one or more strings, compared to the tension pulling the fiber bundle forwards, the straight shape of fiber bundle will also be affected, obtaining a more or less helical overall shape prior to and during the curing stage.

The elongate fiber bundle is then chopped into units having the required length specified above, and bagged, suitable for use.

It should be appreciated that the pitch given to the fiber bundle, and hence the MiniBars™ is dependent upon the difference in tension between the tension in said one or more thin strings during winding and the tension applied for
pulling the fiber bundle forward during the winding process.
The higher tension in said one or more thin strings compared
to that of the fiber bundle, the shorter pitch and deeper
helical indents.

The invention claimed is:

1. Reinforcement bar for concrete structures, comprising
a plurality of parallel fibers, tensioned, comprising at least
one of basalt, carbon, or glass fiber, embedded in a cured
matrix, the bar having an average length in a range of 20 mm
to 200 mm, and an average diameter in a range of 0.3 mm
to 3 mm, the bar being made of at least one fiber bundle
comprising the plurality of parallel fibers, characterized in
that at least a part of a surface of the bar is deformed to
provide a deformation of at least a part of the surface of the
bar prior to or during a curing stage of the matrix such that
the deformation is secured in the cured matrix, by means of:

a) one or more strings of an elastic or inelastic, tensioned
material being helically wound around said at least one
fiber bundle comprising the plurality of parallel fibers
prior to curing of the matrix in which the fibers are
embedded, maintaining the fibers in a parallel state
during curing and providing an uneven external surface
with longitudinally arranged helical indents in a lon-
gitudinal direction on the surface of said at least one
fiber bundle in the matrix of the reinforcement bar, and b) said bar being provided with a surface shape and/or
texture which contributes to bonding with the concrete
thereby providing a roughened surface, wherein a higher tension is applied to the one or more
strings than the at least one fiber bundle, thereby
providing a twist in the at least one fiber bundle.

2. Reinforcement bar according to claim 1, wherein an
additional one or more strings are helically wound in an
opposite direction of the one or more strings around the said
at least one embedded fiber bundle in the matrix.

3. Reinforcement bar according to claim 1, wherein a
pitch length of a helix is in the range of 10 mm to 22 mm.

4. Reinforcement bar according to claim 1, wherein an
angle α of a helix formed by the helically wound string
around the at least one fiber bundle with respect to a center
line of the reinforcement bar is in a range between 4 to 8
degrees.

5. A method for manufacturing the reinforcement bar as
defined by claim 1, wherein the bar comprises the plurality
of parallel fibers comprising at least one of basalt, carbon, or
glass fiber embedded in the cured matrix, the bar having a
length in the range 20 mm to 200 mm, and a diameter in the
range of 0.3 mm to 3 mm, characterized in that the bar is
made of the at least one fiber bundle, which prior to or
during a curing process are provided with a surface texture
that facilitates bonding with the concrete, said surface tex-
ture is obtained by helically winding one or more strings of
an elastic material around the at least one fiber bundle.

6. Method according to claim 5, wherein the one or more
strings are helically wound prior to curing of the matrix
holding the fibers in the parallel state during curing and
providing an uneven external surface in a longitudinal
direction of the reinforcement bar.

7. Method according to claim 6, wherein another one or
more strings are helically wound in opposite directions of
the one or more strings.

8. Method according to claim 6, wherein the one or more
strings are helically wound at an angle α which is in a range
between 4 and 8 degrees with respect to a center line of the
bar.

9. A method comprising:

mixing the reinforcement bar as defined in claim 1 with
green concrete, and repairing a cracked concrete structure with the mixture,
the mixture configured to provide structural integrity to
the concrete structure.

* * * * *